July 3, 1956
L. ROSENBERG ET AL
2,753,420
RADIANT HEAT DETECTOR
Filed March 18, 1953
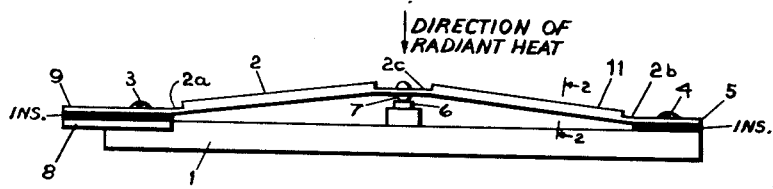
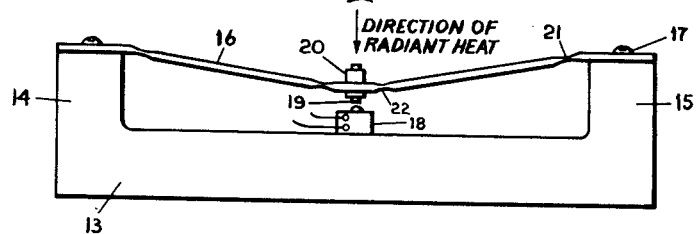
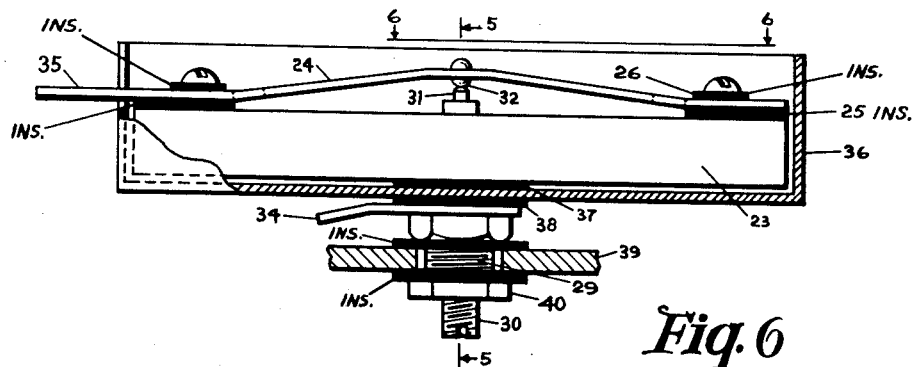
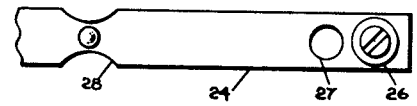
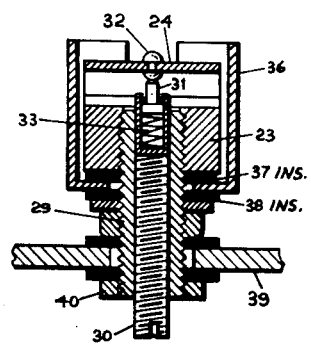
INVENTORS
LAWRENCE ROSENBERG
RAYMOND B. LEWTHWAITE
BY
ATTORNEY 0# United States Patent Office 2,753,420
Patented July 3, 1956

2,753,420

RADIANT HEAT DETECTOR

Lawrence Rosenberg, Fairlawn, and Raymond B. Lewthwaite, River Edge, N. J., assignors to International Telephone and Telegraph Corporation, a corporation of Maryland Application March 18, 1953, Serial No. 343,154

4 Claims. (Cl. 200—137)

This invention relates to thermally responsive devices and more particularly to radiant heat detectors of the uni-metal type.

There are many needs for a truly radiant heat detector, that is, one which will respond to sudden small changes in a source of radiant heat while remaining substantially insensitive to changes of wide range in ambient temperature. Thermal devices employing a bi-metallic element are especially responsive to changes in the ambient temperature and, therefore, are not satisfactory as radiant heat detectors. In U. S. Patents 2,402,312 and 2,421,915, heat detectors of the uni-metal type are provided for the purpose of detecting sudden changes in ambient temperature while less sensitive to gradual changes in ambient temperature. The first mentioned patent discloses prestressed elements for "snap action" while the second discloses a double wire arrangement disposed under a predetermined stress with one wire shielded so that the shielded wire is less responsive than the other to sudden changes in temperature. While these uni-metal temperature responsive devices provide certain advantages over bi-metallic devices they are either relatively involved structurally and, therefore, expensive or they are filmsy structurally and, therefore, tend to vibrate easily when subjected to shock.

One of the objects of this invention is to provide an improved radiant heat detector of the uni-metal type which is sturdy and relatively simple structurally.

Another object of the invention is to provide an improved radiant heat detector of the uni-metal type which is capable of responding quickly to small sudden changes in the radiant heat of a given source and yet substantially insensitive to wide changes in the ambient temperature.

One of the features of the invention is the employment of two members of the same material or of two materials having substantially the same coefficient of expansion. One member is preferably sturdier than the second to which the second is anchored at spaced points. The second member is preferably of flat strip material, although other shapes may be employed, and adapted to be disposed relative to a source of radiant heat as to present to such source an area larger than that presented thereto by the sturdier member. This insures that the strip will absorb more heat and will expand more quickly than the sturdier member upon a sudden change in the radiant heat. This differential of expansion results in relative movement whereby actuation of the switch contacts is effected. If desired, the strip area may be blackened to enhance its heat absorbing quality. Additional features include the provision of heat barriers and hinge portions adjacent the points of anchorage. The midsection of the strip may also be rendered more flexible than the rest of the strip by reducing the cross-sectional area thereof or by stiffening the portions of the strip between the mid section and the points of anchorage thereof by means of ribs, corrugations or flanges.

The above-mentioned and other features and objects of this invention and the manner of attaining them will become more apparent by reference to the following description taken in conjunction with the accompanying drawings, wherein:

Fig. 1 is a side view in elevation of one embodiment of the radiant heat detector according to the principles of this invention;

Fig. 2 is a cross-sectional view taken along line 2—2 of Fig. 1;

Fig. 3 is a side view in elevation of another embodiment of this invention;

Fig. 4 is a side view in elevation with parts in crosssection of another embodiment of the invention;

Fig. 5 is a cross-sectional view taken along line 5—5 of Fig. 4; and

Fig. 6 is a view in plan of a portion of Fig. 4, the view being taken along line 6—6 of Fig. 4.

Referring to Figs. 1 and 2 one embodiment of the radiant heat detector of this invention is shown to comprise a sturdy member 1 in the form of a bar of conductive material and a second member 2 preferably in the form of strip material although other forms and shapes may be employed. The two members are preferably of the same conductive material, although they may be of different material so long as the materials thereof have substantially the same coefficient of expansion. The ends of the strip 2 are anchored, as indicated at 3 and 4, to the bar 1 at spaced points, the two members being separated at such points by layers of insulation as indicated at 5. The bar 1 is provided with a contact 6 which is carried by the midsection of the bar and is preferably resilient, that is, the contact is urged outwardly toward its outer position by means of a spring similar to that shown in Fig. 5. The mid section of the strip 2 is adapted to engage the contact 6 and, if desired, may be provided with a contact bead 7 riveted or otherwise secured to the strip 2. The ends of the bar 1 and strip 2 are provided with leads 8 and 9, respectively, for connection to a circuit to be controlled.

As shown in Figs. 1 and 2, it is preferable to bow the strip member 2 so that upon expansion thereof relative to the bar 1 it will bow still further outwardly and thereby open contacts 6 and 7. In order to take the most advantage of small changes in relative expansion of the two members the portions of the strip 2 between the midsection and the ends thereof are stiffened by providing the strip with one or more ribs longitudinally thereof such as indicated at 10 in Fig. 2 and/or by flanging the edges of such portions as indicated at 11 and 12. Such stiffened portions are spaced from the points of anchorage and from the mid section a sufficient distance to provide resilient hinge portions 2a, 2b and 2c.

The detector such as shown in Figs. 1 and 2 may be mounted by means of the leads 8 and 9 or by other tabs connected to the assembly so as to expose the flat surface of the strip 2 in the direction of the source of radiant heat. In this way the strip 2 will have an area exposed to the source of radiant heat greater than the bar 1 which is shaded for the most part by the strip 2. The strip 2, as well as strips 16 and 24, Figs. 3 and 4, may also have the surface thereof in the direction of the source of radiant heat blackened to thereby enhance its head absorbing quality.

In Fig. 3 the bar member 13 is shown to have right angle portions 14 and 15 at the ends thereof to which the strip member 16 is anchored as indicated at 17. In this embodiment, the strip 16 may be in direct contact with the bar portions 14 and 15, or thermally insulated therefrom, since the switch contacts in this embodiment are independent of the members 13 and 16 in that they are contained in a housing 18 and may be of the type known as a "Micro-switch." The strip 16 preferably carries a switch engaging element 19 carried by a cylinder 20 which includes an adjustment screw. The strip is bowed inwardly toward the bar 13 so that upon expansion of the strip relative to the bar 13 the mid section thereof carrying the element 19 is moved toward the switch 18 thereby closing the contact thereof. In order to enhance the flexibleness of the strip adjacent the points of anchorage and the mid section, the strip is reduced in thickness as indicated at 21 and 22. This reduction in thickness produces flexible hinge portions and also heat barriers in that a smaller conductive path is provided for heat from the strip to the bar 13.

In Figs. 4, 5 and 6, an embodiment is shown similar to that shown in Fig. 1. The device comprises a bar member 23 and a strip member 24, the strip member being bowed outwardly with respect to the bar and anchored thereto through insulating spacers 25 by a screw fastener 26. The strip as shown in Fig. 6 is provided with openings, such as indicated at 27, adjacent the end thereof and a reduced cross-sectional area as indicated at 28 at the midsection thereof. These reduced cross-sectional portions provide for increased flexibleness of the strip adjacent the points of anchorage and at the mid section, and at the same time form heat barriers in that the conductive path is reduced.

The bar 23 is provided with a hollow stud 29 disposed at right angles to the mid section of the strip 24. The stud is provided with threads for threadably receiving the support 30 which carries contact 31 for engagement with contact 32 of strip 24. The contact 31 is backed by a spring 33 to provide for resiliency and the support 30 is made adjustable in the stud whereby the contacts 31 and 32 may be pre-adjusted. The circuit connections for contacts 31 and 32 comprise leads 34 and 35.

The stud 29 has mounted thereon a housing 36 which surrounds the bar and strip assembly except for one side which is open to expose the strip 24. This housing is held between insulating washers 37 and 38 and so disposed as to be in spaced relation with respect to the bar and strip assembly. The stud is also employed for supporting the assembly, it being receivable in an opening contained in a support 39 to which the stud is clamped by a nut 40.

The housing shields the assembly and particularly the bar 23 so that the device may be directed toward a source of radiant heat with the maximum portion of the strip 24 exposed to such source. Upon a sudden small change in the heat radiated the strip 24 will absorb the radiated heat in a much greater proportion than the bar 23 thereby producing a differential in expansion and consequently relative movement at the midsection thereof with respect to the bar 23. Such movement separates the contacts 31, 32 to open the circuit for signalling or other control purposes.

While we have described above the principles of our invention in connection with specific apparatus, it is to be clearly understood that this description is made only by way of example and not as a limitation to the scope of our invention, as set forth in the objects thereof and in the accompanying claims.

We claim:

1. A detector for detecting changes in radiant heat, comprising a relatively sturdy bar, a flat relatively flexible conductor strip disposed lengthwise of said bar, the material of said bar and said strip having substantially the same coefficient of expansion, means supporting said bar at the central portion thereof with the end portions of the bar free for movement relative to said supporting means, means securing the end portions of said strip to the free end portions of said bar, and an electrical contact carried by said bar at the central portion thereof, said strip being bowed relative to said bar with the mid-section thereof adapted upon movement relative to said bar to actuate said contact to control a circuit.

2. A detector for detecting changes in radiant heat, comprising a relatively sturdy bar, a flat relatively flexible conductor strip disposed lengthwise of said bar, the material of said bar and said strip having substantially the same coefficient of expansion, means supporting said bar at the central portion thereof with the end portions of the bar free for movement relative to said supporting means, means securing the end portions of said strip to the free end portions of said bar, said securing means including a layer of insulation to electrically isolate said strip from said bar, an electrical contact carried by said bar at the central portion thereof, said strip being bowed relative to said bar with the mid-section thereof adapted upon movement relative to said bar to actuate said contact to control a circuit, and means for adjusting said contact with respect to the bowed portion of said strip.

3. A detector for detecting changes in radiant heat, comprising a relatively sturdy bar, a flat relatively flexible conductor strip disposed lengthwise of said bar, the material of said bar and said strip having substantially the same coefficient of expansion, said bar having an opening in the central portion thereof, a hollow supporting member threadedly receivable in said opening to support said bar with the end portions of the bar free for movement relative to said supporting member, means securing the end portions of said strip to the free end portions of said bar, said securing means including a layer of insulation to electrically isolate said strip from said bar, and electrical contact threadably receivable in said supporting member, said strip being bowed relative to said bar with the mid-section thereof adapted upon movement relative to said bar to actuate said contact to control a circuit, and means for adjusting the position of said contact in a direction axially of said supporting member.

4. A detector for detecting changes in radiant heat, comprising a relatively sturdy bar, a flat relatively flexible conductor strip disposed lengthwise of said bar, the material of said bar and said strip having substantially the same coefficient of expansion, a trough-like housing, means supporting said bar and said housing at the central portions thereof with the bar disposed in spaced relation in said trough and the end portions of the bar free for movement relative to said housing and said supporting means, means securing the end portions of said strip to the free end portions of said bar on the exposed side of said bar, and an electrical contact carried by said bar at the central portion thereof, said strip being bowed relative to said bar with the mid-section thereof adapted upon movement relative to said bar to actuate said contact to control a circuit, said supporting means being adapted to support said bar, strip and housing assembly so that said strip is exposed in its overlying position relative to said bar in the direction of a given source of radiant heat.

References Cited in the file of this patent

UNITED STATES PATENTS

| | | |
|---|---|---|
| 986,801 | Claxton | Mar. 14, 1911 |
| 1,130,985 | Kuhn | Mar. 9, 1915 |
| 1,138,841 | Braun | May 11, 1915 |
| 1,641,170 | Karlson | Sept. 6, 1927 |
| 2,185,433 | Fenn et al. | Jan. 2, 1940 |
| 2,319,317 | Gille | May 18, 1943 |
| 2,373,857 | Smith | Apr. 17, 1945 |
| 2,619,567 | Walbridge | Nov. 25, 1952 |